United States Patent [19]

Lennström et al.

[11] Patent Number: 4,689,811
[45] Date of Patent: Aug. 25, 1987

[54] CALL DIVERTER FUNCTION IN AN EARLY CARE TELEPHONE SYSTEM

[75] Inventors: Carl A. Lennström, Tyresö; Mats I. Claeson, Johanneshov, both of Sweden

[73] Assignee: Telefonaktiebolaget LM Ericsson, Stockholm, Sweden

[21] Appl. No.: 857,746
[22] PCT Filed: Sep. 17, 1985
[86] PCT No.: PCT/SE85/00353
 § 371 Date: Apr. 16, 1986
 § 102(e) Date: Apr. 16, 1986
[87] PCT Pub. No.: WO86/01960
 PCT Pub. Date: Mar. 27, 1986

[30] Foreign Application Priority Data

Sep. 17, 1984 [SE] Sweden ............................ 8404667

[51] Int. Cl.⁴ ............................................. H04M 3/54
[52] U.S. Cl. ....................................... 379/38; 379/51; 379/46; 379/214
[58] Field of Search ................... 379/38, 40, 46, 51, 379/52, 211, 212, 214, 210

[56] References Cited

U.S. PATENT DOCUMENTS

| | | | |
|---|---|---|---|
| 3,700,813 | 10/1972 | Colman | 379/357 |
| 3,867,581 | 2/1975 | Pommerening | 379/211 |
| 4,028,499 | 6/1977 | Hovagimyan et al. | 379/211 |
| 4,064,368 | 12/1977 | Dibner | 379/38 |

Primary Examiner—James L. Dwyer
Attorney, Agent, or Firm—Roberts, Spiecens & Cohen

[57] ABSTRACT

A method and apparatus relating to telecommunication systems of the early care telephone type, in which a plurality of subscribers (TA) may be connected to one or more supervision centers (A-C) via a telephone exchange (EX). If any of the centers are night service-connected or out of operation for some reason, a call from a subscriber will be automatically re-routed to another center. When a subscriber equipment unit (SE) associated with a subscriber (TA) has called the telephone number of a duty center (A), the call is answered automatically by an automatic telephone answerer (ATS) or by other equipment which can execute a call diverter function. Instead of a spoken message, there is recorded on the automatic telephone answerer a signal which enables receiving a new telephone number in the subscriber unit (SE), which number is recorded on the telephone answerer. The telephone number message can be accompanied by a single which causes the subscriber unit to disconnect the established telephone connection, or this can be achieved by a caller's time monitoring facility's disconnecting when criterion acknowledgement signal has not been received. After a suitable time lag, the calling sequence is started once again, but to the supervision center (C) intended by the received telephone number.

10 Claims, 1 Drawing Figure

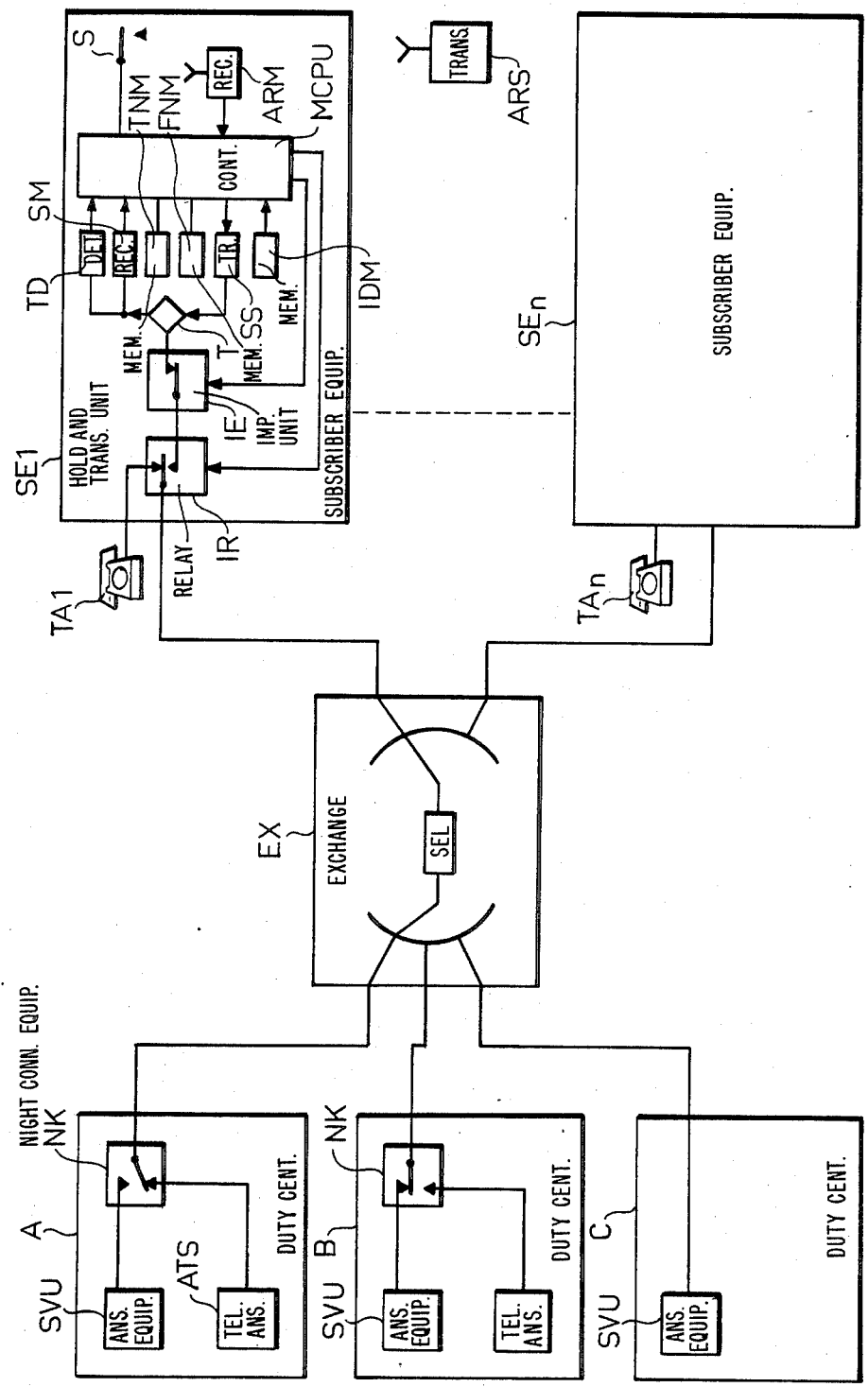

CALL DIVERTER FUNCTION IN AN EARLY CARE TELEPHONE SYSTEM

FIELD OF INVENTION

The invention relates to a method and apparatus in a telecommunication system in which a number of subscribers have the possibility of connection to one or more centrally situated surveillance centers common to the subscribers.

BACKGROUND

In telecommunication systems of the kind mentioned above, more specifically in early care telephone systems, the subscribers, who are usually elderly with restricted mobility or otherwise disabled, have a need of being readily able to communicate, using their own telephone, with somebody who can quickly give them the help sought.

In systems where an automatic caller is used to ring, via the public telehpone network, a predetermined telephone number where a given function is to be automatically or manually executed, there are different known methods for getting the caller to select another telephone number if, for some reason, the first one cannot be answered. The systems may operate according to the following alternatives:

1. The caller is programmed for selecting another predetermined number at the next attempt at calling.
2. The call is answered and, via conventional call diverter equipment, is put through by ringing, via another telephone line, the telephone number where the function sought after can be provided.
3. The call is answered, and with the aid of a special signal the caller is directed to call up another predetermined telephone number.
4. The physical line is re-routed at the telephone exchange. The re-routing function is generally known as a diverter function.

The alternatives known to the prior art result in certain problems, however. Alternatives 1 and 3 require that the caller be programmed to ring the alternative telephone number. A change in the alternative number brings with it reprogramming of all the callers in the system. Alternative 2 requires expensive equipment, where it is required that two telephone subscribers are connected to the equiment. Alternative 4 requires switching equipment at the telephone exchange and extra wire pairs for controlling it.

SUMMARY OF INVENTION

The method and apparatus in accordance with the invention are intended, for example, for implementation in an early care telephone system of the type illustrated in Swedish patent application No. 7801578-1.

It is an object of the invention to provide for an improved call diverter function especially with respect to early care telephone systems.

In order that the invention may be better understood, the basic principle of the function and use of the system in accordance with the mentioned application is summarized. As previously mentioned, people such as pensioners and disabled are sometimes in great need of being readily able to communicate with somebody who can quickly give them the help which is needed. The subscriber equipment of the system is connected to the public telephone network and is programmed to call one or a plurality of telephone numbers related to one or a plurality of duty centers.

When the pensioner wants to contact a duty center, the subscriber equipment operation is initiated with the aid of a built-in press button or with the aid of exterior key functions connected to the equipment. The telephone line, which is normally connected to the telephone apparatus of the pensioner, is switched to the subscriber equipment with the aid of a switching relay. The connection tone is detected and the calling sequence is initiated.

When the call is answered at the duty center, the latter sends an acknowledgement signal, which stops the caller from monitoring to insure that the call really has been answered by a duty center.

The acknowledgement signal also initiates the transmission of an identity code from the subscriber equipment so that the person seeking help can be identified at the duty centers. After this, the call function takes over, the duty centers sending voice control signals, for alternatively switching the microphone and loudspeaker in said subscriber equipment to the pensioner.

Many municipalities are building their pensioners' service such that calls from pensioners are taken by a duty area during the day time, while at night they are received at a central duty station. Some form of call diverter function is necessary for achieving this.

The method and apparatus in accordance with the invention, which solves the problems mentioned, is characterized according to the following:

When the subscriber equipment has rung the telephone number of the duty center and has been connected to it, the call is answered automically by an automatic telephone answerer or other equipment which can imitate the signal picture required for carrying out the call diverter function.

Instead of a spoken message, or in conjunction with one, a signal is recorded in the automatic telephone answerer, and this signal opens a facility of the subscriber equipment to receive a new telephone number, which is recorded by the telephone answerer in a suitable signal form. The telephone number messages can be accompanied by a signal causing the subscriber equipment to disconnect a telephone communication in progress, or this is also achieved by the caller time monitoring facility's disconnecting when the criterion "acknowledgement signal" is not complied with. After a suitable time lag, the calling sequence is started once again.

Dual Tone Multi Frequency (DTMF) signalling is used in the described system for controlling necessary functions via the telephone line.

The invention is not limited to DTMF signalling, and other signalling forms can be envisaged. The criterion for these is end-to-end signalling within a speech band wherein such signalling can be transmitted via an established telephone connection.

The advantages with a call diverter function according to the invention are that the great amount of equipment (the pensioner's equipment) which is envisaged will not need to contain information. Further it does not need to be up-dated with telephone numbers to the duty centers to which so-called night connection is to take place.

Another advantage is also important from the pont of view of safety. If a duty center is knocked out for some reason (faults, cable breakage, etc.), a telephone answerer can be set up in a public telephone exchange and from there it can re-route the calls to duty center in operation.

BRIEF DESCRIPTION OF DRAWING

The system in accordance with the invention will next be described in detail with reference to the accompanying drawing, in which the sole FIGURE is a block diagram of a system including the inventive provisions.

DETAILED DESCRIPTION

As will be seen from the FIGURE, a plurality of subscribers TA1 - TAn are connected via their associated subscriber equipment SE1 - SEn to given duty centers A, B, C, according to the example, via an exchange EX in the public telephone network. Within a geographically more collected unit, it is of course also possible, via a local exhange, to bring about a link between subscribers and one or more locally placed duty centers, i.e., and internal telephone system, without utilizing outside lines. This envolves a certain limitation, however, since there may be telephone numbers, other than those only going to the duty centers, programmed into the subscriber equipment, e.g., numbers to relations and friends.

The figure illustrates an example of a configuration where a given number of subscribers is connected to an area duty centers A and a give number are connected to an area duty centers B. The centers B is only illustrated for the sake of clarity and is not included in the invention itself. A chief duty centers C may receive calls from all subscribers. The units of interest for the invention are illustrated in block diagram form within the duty centers and subscriber equipment SE1.

A functional sequence in accordance with the invention is next described below with reference to the figure. Duty center A is assumed to be "night-connected" so that all calls to the center A will be re-routed to the chief duty center C. In the area duty center A, night connection equipment NK of the type Ericsson KFB 16901 has been actuated such that a connection has been set up between the equipment NK and telephone answerer equipment ATS. From dialing button telephone with DTMF signalling, there has previously been recorded on the telephone answerer an opening code corresponding to a digit, e.g. 3, followed by the telephone number to the chief duty center C. The subscriber equipment SE1 is programmed to ring the area duty center A, i.e. a code corresponding to the number to the area duty center A is normally stored in a memory in the subscriber equipment. The memory is of the type E$^2$PROM (Electrical Eraseable Programable Read Only Memory) such as a General Instrument 5901.

Let it now be assumed that the subscriber TA1 desires contact with the duty center A. The sequence is started by the subscriber's either actuating an internal starting button S in his subscriber equipment SE1 or conventionally actuating an external starting unit, e.g. a radio transmitter ARS, which in turn controls the subscriber equipment by a radio receiver ARM contained therein. A control unit MCPU, which is a microprocessor such as an INTEL 8749, now energizes a connection relay IR and by a holding and transmission unit T, containing normal transformer and amplifier functions towards the line, there is formed a loop to the public exchange EX, which sends the connection tone to the subscriber equipment SE1. The connection tone is received and detected via the transmission unit T in a connection tone detector TD controlled by the control unit MCPU. When the connection tone has been approved, the control unit reads the programmed-in telephone number of the chief duty center from a permanent number memory FNM, which is a partial area of said E$^2$PROM memory, and starts transmission of the number. This can be done with the aid of interruption impulsing via an impulsing unit IE, or, if the telephone network exchange is equipped for DTMF signalling, via a signal transmitter SS of the type MITEL 5089 intended for DTMF signalling. When the exchange EX has received the transmitted telephone number, its selector means are set towards the duty center A.

In the control unit MCPU, there is simultaneously started time monitoring for checking that the reply acknowledgement signal is obtained from the duty center within a given time (about 90 seconds). When the telephone network selector means are set, the exchange checks that the desired telephone number is unoccupied. If the number is engaged, the engaged tone is sent to the subscriber equipment SE1, which detects this via the transmission unit and the detector TD. The control unit breaks the loop to the telephone network exchange via the impulsing unit IE and makes a pause of about 30 seconds, subsequent to which a new attempt at calling is made. If the telephone number is not engaged, the ringing tone is sent to the subscriber equipment and the ringing signal to the area duty center A. Here the call is answered automatically and the telephone answerer is activated and sends out the opening code 3.

The digit 3 is received in the subscriber equipment via the unit T and a signal receiver SM of the type MITEL 8870, where the digit for the DTMF signalling is decoded and fed into the control unit MCPU which then opens and prepares storage of the coming telephone number in a temporary number memory TNM. The recorded telephone number is then sent from the telephone answerer ATS in the area duty center A, i.e. according to the example the number is sent to the chief duty center C, this number being received by the subscriber equipment SE1, the signals being decoded by the unit T and receiver SM, while the received digits are stored in the memory TNM via the control unit, the memory TNM being a RAM memory.

Since no acknowledgement signal was obtained from the area duty center A, the time which the control unit MCPU monitors is exceeded, causing it to interrupt the loop via the unit IE to the exchange EX, which then disconnects the call to the area duty center A.

In the code from the telephone answerer, it is also possible to include a terminal portion which is a signal telling the subscriber equipment that no acknowledgement signal is coming. The subscriber equipment can then disconnect the connection immediately without waiting for time triggering.

The control unit MCPU monitors a pause of about 30 seconds, after which the loop to the exchange is closed once again via the impulsing unit IE. The connection tone is detected conventionally by the transmission unit T and the detector TD and is checked by the control unit. When the connection tone has been approved, the control unit reads the stored telephone number from temporary number memory TNM, and starts transmission of the number, either via the impulsing unit IE (interruption impulsing) or via the signal transmitter SS (DTMF signalling), depending on the application.

When the exchange EX has received the transmitted telephone number, its selector means are set to the chief duty center C. If the number is disengaged, the call signal is sent from the exchange to the center C and the ringing tone is sent to the subscriber equipment SE1. When the call is answered an acknowledgement signal, a code corresponding to the digit 4, for example, is sent from the chief duty center C to the subscriber equipment. The digit is received via the transmission unit T, and the receiver SM, and is decoded and fed into the control unit MCPU, thus disabling its time monitoring facility. The control unit reads information from an identity memory IDM, and starts the transmission via the signal transmitter SS and transmission unit T of an identity number already programmed into the memory to the chief duty center C, where it is received and detected by answering equipment SVU, in the form of a multi-line telephone, which also illuminates a sign indicator for identifying the calling subscriber. Conversation can than be started.

The memory IDM also constitutes a partial area of the memory $E^2PROM$. As will be seen, several memory functions are collected in a memory $E^2PROM$, but for the sake of simplicity and clarity, they are depicted as individual units in the described embodiment, which is naturally also possible.

No description has been provided regarding loading into and reading out from the memories, or for setting up communications via the exchange, since this is part of the prior art.

What is claimed is:

1. A method, which is used in a telecommunication system in which a plurality of subscriber units are connectible via a telephone exchange to common surveillance stations constituting duty centers, said duty centers being selectively operable as night service-connected duty centers and further being selectively operable in conditions in which they are and are ot in operation, said method enabling automatically switching from one of said duty centers to another of said duty centers when calls are made to a night service-connected duty center or to a duty center not in operation, said method comprising activating a subscriber unit to send a predetermined numerical code corresponding to a telephone number to a first of said duty centers according to the number, and adapting said first duty center, if it is night-service-connected or not in operation, to send back to the thusly activated subscriber unit a numerical code previously stored in the first center and corresponding to the telephone number of a second of said duty centers, the latter said number being stored in the subscriber unit, the duty centers when operable sending acknowledgement signals and when night service-connected or not operable omitting to send acknowledgement signals adapting the thusly activated subscriber unit for a predetermined time lapse after omission of an acknowledgement signal from said first duty center to disconnect the connection to said first duty center and for a further time lapse to set up a connection to said second duty center via the telephone exchange by transmitting thereto the stored number of said second duty center, an acknowledgement signal being sent to the subscriber unit from the second duty center on detection of the thusly stored and subsequently transmitted number, an identifying signal being sent from the activated unit subscriber in return to said second duty center.

2. A method as claimed in claim 1, wherein said subscriber equipment detects a code from said first duty center signifying that disconnection of the connection can take place without waiting for the said predetermined time lapse.

3. A telecommunication system comprising a plurality of subscriber units, a telephone exchange, a plurality of surveillance stations constituting duty centers, said exchange selectively connecting the subscriber units to the duty centers, said duty centers being selectively operable as night service-connected duty centers and further being selectively operable in conditions in which they are and are not in operation, and means for automatically switching from one duty center to another duty center when calls are made to a night service-connected duty center or to a duty center not in operation, each subscriber unit (TA1 - TAn) being connectible to respective subscriber-equipment units (SE1 - SEn), each subscriber equipment unit comprising:

first memory means, means (S) for activating the associated subscriber equipment unit, control means (MCPU) for storing and reading out and transmission means (SS, IE) for transmitting a predetermined first numerical code corresponding to the telephone number of a first of said duty centers (A) from said first memory means (FNM) to said first duty center (A) via said telephone exchange (EX); said first duty center (A) comprising means (NK) for night service-connection of the first duty center, and an automatic anwering means (ATS) for storing and transmitting a second numeral code corresponding to the telephone number of a second of said duty centers (C), receiving means (SM) for receiving and decoding said second numerical code, a second memory means (TNM) for temporarily storing said second numerical code while being controlled by said control means (MCPU), after a predetermined time said control means (MCPU) reading said second numerical code from said second memory means (TNM), which is thereby emptied, said transmission means (SS, IE) sending, while under the control of the control means (MCPU), said temporarily stored second numerical code of said second duty center (C) to the exchange (EX), said second duty center including answering equipment (SVU) for receiving ringing signals from the exchange and for transmitting an acknowledgement signal to the associated subscriber equipment unit after having answered a call therefrom, the control means (MCPU) in the subscriber equipment unit including and reading identification information from a third memory means (IDM) and transmitting the same to the answering equipment (SVU) in said second duty center (C) via the transmitter means (SS, IE), identification of the caller taking place in said second duty center.

4. A system as claimed in claim 3, wherein said exchange (EX) is an exchange in a public telephone network.

5. A system as claimed in claim 3, wherein said exchange (EX) is a local exchange.

6. A system as claimed in claim 3, wherein for operational interruption in one said duty center, said answering means (ATS) is connected directly by said exchange (EX) for re-routing calls.

7. A system as claimed in claim 3, wherein said first and third memory means (FNM) and (IDM) are formed from a common memory means.

8. A system as claimed in claim 3, wherein said first and third memory means (FNM) and (IDM) are separate memories.

9. Apparatus as claimed in claim 3, characterized in that said transmitter means (SS, IE) is a transmitter (SS) for DTMF signalling.

10. A system as claimed in claim 3, wherein said transmitter means (SS, IE) includes a transmitter (IE) for interruption impulsing.

* * * * *